US009399204B2

(12) United States Patent
Milhorn

(10) Patent No.: US 9,399,204 B2
(45) Date of Patent: *Jul. 26, 2016

(54) COLOR DISPENSING SYSTEM AND METHOD

(71) Applicant: Kirsten E. Milhorn, Falls Church, VA (US)

(72) Inventor: Kirsten E. Milhorn, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,637

(22) Filed: Mar. 3, 2014

(65) Prior Publication Data

US 2014/0174595 A1 Jun. 26, 2014

Related U.S. Application Data

(63) Continuation of application No. 12/058,259, filed on Mar. 28, 2008, now Pat. No. 8,666,540.

(51) Int. Cl.

| G06F 17/00 | (2006.01) |
| B65B 1/04 | (2006.01) |
| B01F 13/10 | (2006.01) |
| B01F 9/00 | (2006.01) |
| B44D 3/00 | (2006.01) |
| G06Q 20/20 | (2012.01) |
| G06Q 30/06 | (2012.01) |

(52) U.S. Cl.
CPC ........... *B01F 13/1063* (2013.01); *B01F 9/0005* (2013.01); *B01F 13/1055* (2013.01); *B44D 3/003* (2013.01); *G06Q 20/20* (2013.01); *G06Q 30/0601* (2013.01)

(58) Field of Classification Search
CPC . B01F 13/1055; B01F 9/0005; B01F 13/1063
USPC .................................. 700/239, 231–233, 240
See application file for complete search history.

(56) References Cited

U.S. PATENT DOCUMENTS

| 3,223,389 A | 12/1965 | Simmonds |
| 4,323,097 A | 4/1982 | Achen |
| 4,705,083 A | 11/1987 | Rossetti |

(Continued)

FOREIGN PATENT DOCUMENTS

| EP | 1428569 A2 | 6/2004 |
| WO | 8602320 A1 | 4/1986 |
| WO | 2006008590 A1 | 1/2006 |

OTHER PUBLICATIONS

International Preliminary Report on Patentability for Application No. PCT/US2009/037334, issued Sep. 28, 2010.

(Continued)

*Primary Examiner* — Michael K Collins
(74) *Attorney, Agent, or Firm* — Banner & Witcoff, Ltd.

(57) ABSTRACT

A paint creation and dispensing system includes a variety of components for creating paint of a selected color and paint type and for processing payment for the paint. The system may be configured to receive a color selection in a variety of ways including through customer selection and via an electronic color reader (portable or stationary). The paint system may allow a customer to obtain an amount (e.g., a sample or a full gallon) of paint without help from a store employee or other personnel. In one or more arrangements, the paint system may be networked so that a customer may pre-order paint, upload color selections, make a payment, and or order additional supplies of paint or other products based on the color chosen for final painting.

15 Claims, 11 Drawing Sheets

(56) References Cited

U.S. PATENT DOCUMENTS

| | | | |
|---|---|---|---|
| 4,804,024 A | 2/1989 | Arnemann | |
| 4,827,993 A * | 5/1989 | Ito | B01F 13/1055 141/104 |
| 5,023,814 A | 6/1991 | Guillemin | |
| 5,078,302 A | 1/1992 | Hellenberg | |
| 5,119,973 A | 6/1992 | Miller et al. | |
| 5,203,378 A | 4/1993 | Williams | |
| 5,203,387 A * | 4/1993 | Howlett et al. | 141/103 |
| 5,268,849 A * | 12/1993 | Howlett et al. | 700/226 |
| 5,904,421 A | 5/1999 | Mazzalveri | |
| 6,095,373 A | 8/2000 | Boers | |
| 6,230,938 B1 * | 5/2001 | Boers | B01F 7/1695 215/322 |
| 6,269,978 B1 | 8/2001 | Sindoni | |
| 6,672,341 B2 * | 1/2004 | Bartholomew et al. | 141/18 |
| 6,701,977 B2 | 3/2004 | Taylor et al. | |
| 7,099,740 B2 * | 8/2006 | Bartholomew et al. | 700/231 |
| 7,132,470 B2 | 11/2006 | McClain et al. | |
| 7,206,664 B2 | 4/2007 | Schmid | |
| 7,416,140 B2 * | 8/2008 | Camilleri | B05B 7/2478 222/105 |
| 8,091,735 B2 | 1/2012 | Girard et al. | |
| 8,141,599 B2 | 3/2012 | Korenkiewicz et al. | |
| 8,666,540 B2 * | 3/2014 | Milhorn | 700/239 |
| 2002/0047020 A1 | 4/2002 | Dudek | |
| 2002/0145938 A1 * | 10/2002 | Sasaki | B01F 9/0001 366/220 |
| 2003/0158788 A1 | 8/2003 | Turpin et al. | |
| 2004/0046051 A1 * | 3/2004 | Santa Cruz | B01F 13/1055 239/303 |
| 2005/0092386 A1 | 5/2005 | Kaufhold et al. | |
| 2006/0087914 A1 * | 4/2006 | Eckart | B01F 13/1055 366/209 |
| 2006/0283521 A1 | 12/2006 | Bartholomew et al. | |
| 2008/0195250 A1 | 8/2008 | Post et al. | |
| 2009/0032965 A1 | 2/2009 | Urakami et al. | |
| 2009/0228143 A1 * | 9/2009 | Hughes | B01F 13/1066 700/239 |
| 2009/0248199 A1 * | 10/2009 | Milhorn | 700/239 |
| 2009/0276091 A1 | 11/2009 | Duha et al. | |
| 2014/0174595 A1 * | 6/2014 | Milhorn | 141/9 |

OTHER PUBLICATIONS

International Search Report and Written Opinion for International Application No. PCT/US09/37334, mailed May 12, 2009, 9 pages.
"Creating a Color Scrapbook", <http://www.behr.com/behrx/inspiration/artistic_4.jsp>, 2 pages.

* cited by examiner

COLOR DISPENSING SYSTEM AND METHOD

CROSS REFERENCE TO RELATED APPLICATIONS

This application is a continuation of and claims priority to co-pending U.S. application Ser. No. 12/058,259 filed Mar. 28, 2008, and entitled "Color Dispensing System and Method," which is incorporated herein by reference in its entirety.

FIELD OF ART

The invention relates generally to systems, methods and apparatuses for dispensing custom colored items and solutions. In particular, aspects relate to the creation, dispensing and purchase of an amount of paint according to a color specified by a user.

BACKGROUND

With an ever growing palette of colors, customers are increasingly in need of customized paints and paint colors. From repairing damage to a wall to updating a living space, various types of paint and paint colors and paint textures can have dramatic effects on a room or a building. Many hardware stores and the like allow customers to purchase customized paints by selecting a color and mixing a full size container of the selected color of paint. The preparation of the paint also normally requires the help of store personnel to identify and obtain the correct base paint, open the lid and operate the color customization machine. However, it is rare for a person to know, without trial and error, what colors and types of paint suit the person's taste and work best in a given space. Thus, a customized container of paint may often go to waste if a customer returns home only to realize that the paint is the wrong color or unsuitable for a given space. Not only does the paint go to waste, the customer also spends a significant amount of time and money that multiplies given the number of colors the customer tries out in making an ultimate color and paint decision.

SUMMARY

A paint creation and dispensing system including a point of sale system and paint preparation system provides a customer with a system and method for selecting a paint color and paint type, obtaining the selected color and/or type of paint, and paying for the selected paint. Such a paint creation and dispensing system may be used to create sample-sized amounts of paint. Alternatively or additionally, such a system may also be used to create full sized amounts (e.g., gallons or quarts) of paint. Paint colors may be selected in a variety of ways including using color suggestions, using a color reader/scanner, or browsing a color palette. According to one aspect, a paint creation and dispensing system may include a storage area for holding sample-sized containers of base paint, a mixing device, a tint injector, a point of sale system and a color reader. Such a system may thus allow a customer to obtain and pay for a paint sample through a single system and without the need for assistance from a store employee or the like. According to another aspect, multiple samples or other amounts of paint may be prepared and purchased at one time to further enhance the efficiency of obtaining paint.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
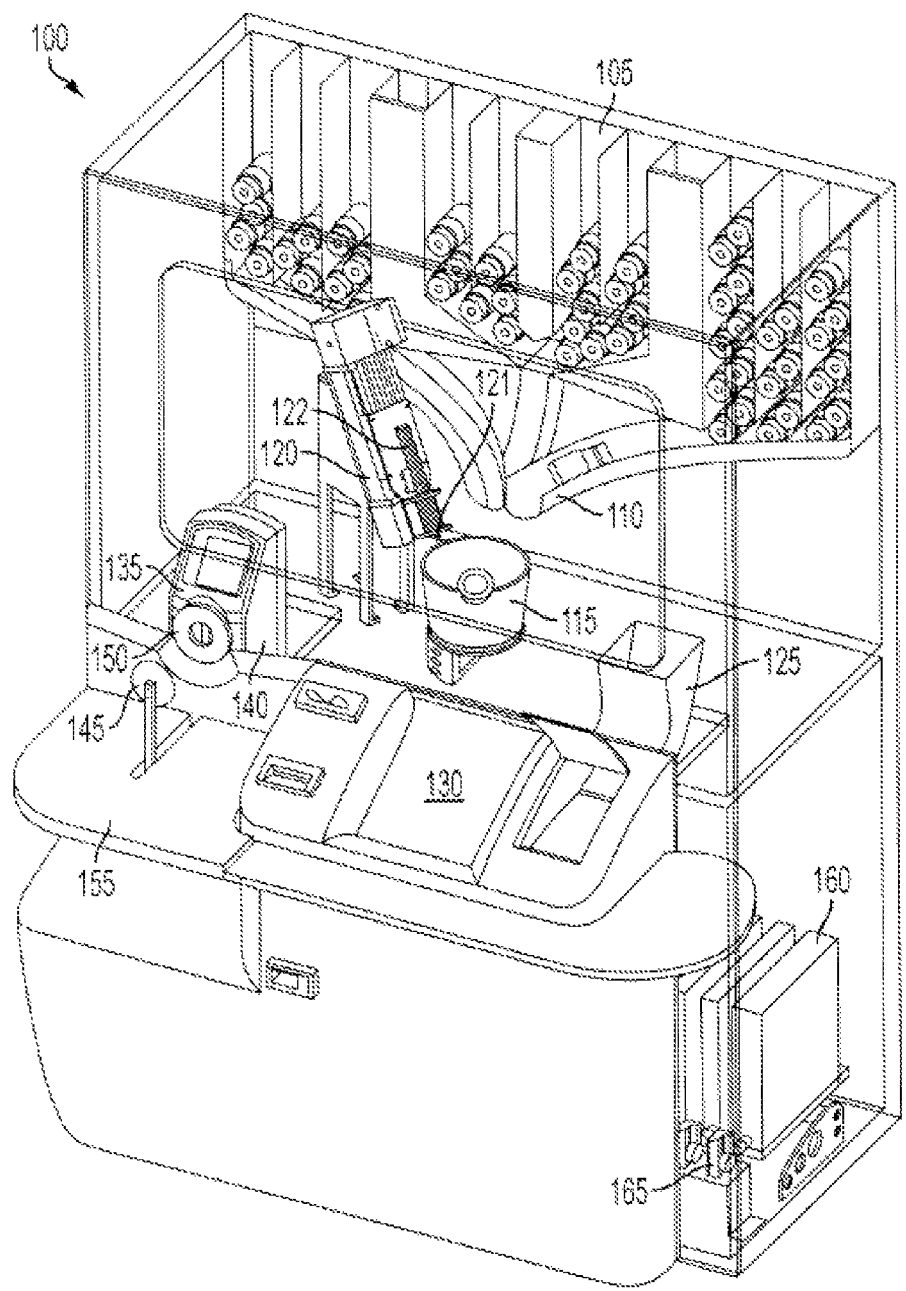
FIG. 1 illustrates a paint sample system configured to create and dispense paint samples according to one or more aspects described herein.

FIG. 1 illustrates a paint sample creation and dispensing system 100 that offers customers a do-it-yourself system for creating and purchasing a sample of paint. Paint samples are generally smaller in size than full quarts, gallons or larger quantities of paints that are more commonly sold in stores. For example, a sample sized paint container may hold between 2 oz. and 5 oz. (inclusive) of paint. Thus, the samples may be purchased at less cost, allowing customers to test out various colors prior to committing to any of the colors. In one example, a person may wish to purchase several samples to apply to a wall or object being painted to determine which color is desired. Paint sample system 100 includes a variety of systems and components that are generally configured to receive a selection of a color, create a sample of the selected color, dispense the sample and process payment for the sample. In particular, paint sample system 100 includes storage area 105, conveyors 110, mixer 115, tint injector assembly 120, dispensing chute 125, purchase interface 130, color reader 135, tint cartridges 160 and tint pumps 165. Storage area 105 is configured to store multiple sample-sized bottles of base paint, such as semi-gloss, gloss, matte, eggshell, satin and flat. Base paints may be mixed with tints to create a variety of colors. Storage area 105 may include multiple separated columns for storing bottles in an organized manner based on the type of base paint, size, interior/exterior use suitability, or the like.

In proximity to storage area 105, paint sample system 100 may include conveyor slides 110 for conveying a sample-sized paint bottle to mixer 115. Either the conveyors 110 or storage area 105 or both may include release mechanisms that allow a paint bottle to exit from storage area 105 and travel down conveyors 110 into mixer 115. In one example, release mechanisms for dispensing paint bottles may be similar to those used in electrical and/or mechanical vending machines (e.g., snack and soda vending machines). In another example, a paint bottle may be released through a series of release doors (not shown) configured to allow a single bottle to exit from storage area 105. In one or more arrangements, conveyors 110 or storage area 105 may be configured to release multiple bottles for a transaction depending on the needs of the purchasing customer.

As discussed, once a paint sample bottle has been released from storage area 105, the bottle is conveyed into mixer 115. Mixer 115 may be configured to hold and mix a sample in a single paint bottle or samples in multiple paint bottles at one time. In particular, mixer 115 may include a receptacle (e.g., receptacle 520 of FIG. 5) that may be tilted at an angle (e.g., 30 degrees) relative to a horizontal or vertical plane. The receptacle may be configured to receive a paint bottle and to rotate such that the injected tint is mixed with the base paint. The receptacle may also be rotated to receive a paint container or bottle in a specified position, to align a paint container with tint injector assembly 120 or to eject the paint container into dispensing chute 125. In one or more arrangements, the entire mixer 115 may rotate or move to mix the paint, to receive a paint container and/or to eject a paint container into dispensing chute 125.

Figure 3:
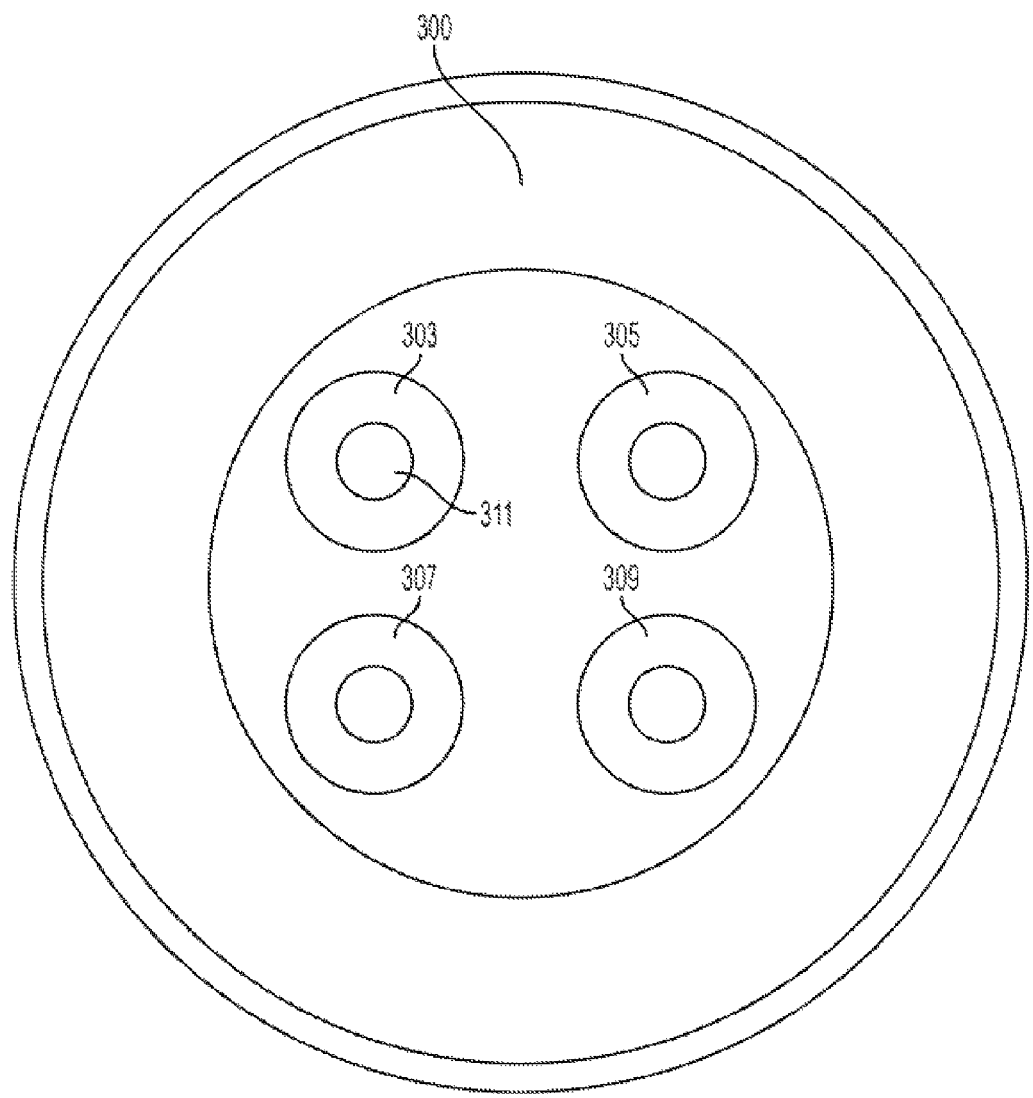
FIG. 3 illustrates a paint mixer container according to one or more aspects described herein.

Mixer 115 may further include one or more securing systems that hold a paint sample bottle in place once the bottle drops in the mixer. FIG. 3, for example, illustrates a mixer 300 having recessed regions 303, 305, 307 and 309, in the bottom. The size and shape of recessed regions 303-309 may correspond to the size and shape of a paint sample bottle with allowance for some leeway. The depth of recessed regions 303-309 may be sufficient to prevent paint sample bottles from slipping or moving within mixer 300 during the tinting and/or mixing process. In one configuration, recessed regions 303-309 may be disposed in a receptacle such as receptacle 520 of FIG. 5.

Additionally or alternatively, mixer 300 may further include openings in the bottoms of each of recessed regions 303-309 so that a paint sample bottle may be ejected from mixer 300 and into a customer delivery chute such as dispensing chute 125 of FIG. 1. For example, an ejection arm may be used to propel a paint sample bottle in recessed region 303 by contacting the paint sample bottle through opening 311. The force and direction with which an ejection arm ejects the paint sample bottle may depend on a variety of factors including a distance and orientation of the destination (e.g., dispensing chute 125 of FIG. 1) and the size and weight of the bottle. Alternate or additional methods of securing the sample bottles in a mixer may also be used. For example, a holding ring may extend from the walls of the mixer and wrap around a paint sample bottle.

Figure 4:
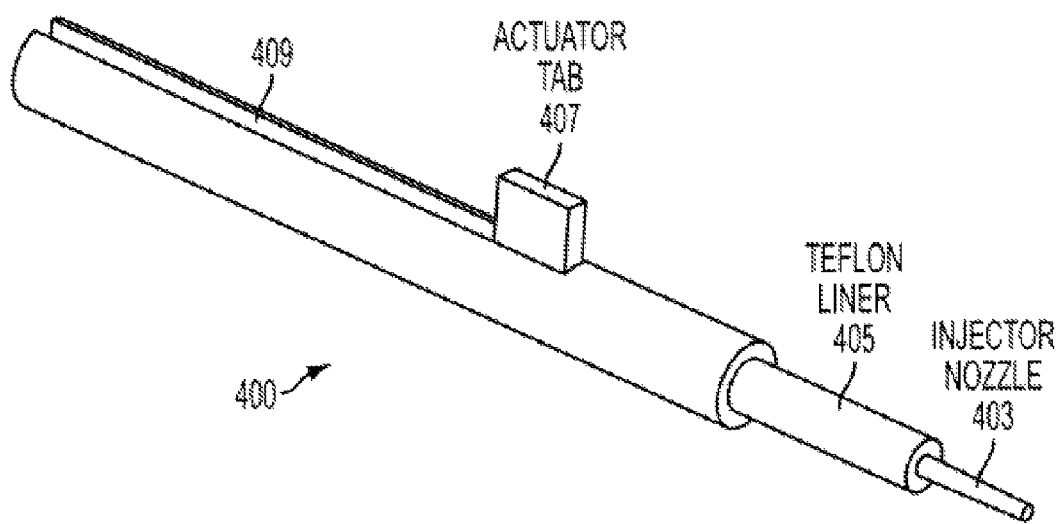
FIG. 4 illustrates an enlarged view of an injector nozzle assembly and mixer portions according to one or more aspects described herein.

FIG. 1 further illustrates paint sampling system 100 including tint injector assembly 120 that is configured to inject various tints into a bottle of base paint based on a selected color. Tint injector assembly 120 includes multiple injection needles 121 that are each connected via one of tubes 122 to a tint reservoir or cartridges 160. Tint may be drawn from cartridges 160 by pumps 165 that may include metering or control systems that control the amount of tint drawn from cartridges 160 and dispensed from injector nozzles. Each injection needle may be configured to extend from the remainder of tint injector assembly 120 so that each needle is able to inject a tint into a paint sample bottle without interference from the remainder of needles 121. The extension of each needle may be provided using mechanical (e.g., hydraulic) or electrical systems or a combination thereof. FIG. 4 illustrates an injection needle 400 having an injector nozzle 403, a needle liner 405 and an actuator tab 407. Actuator tab 407 controls the extension of injector nozzle 403 by sliding along groove 409. Needle liner 405 may be configured to provide smooth extension and retraction of nozzle 403 and may be composed of a low-friction material such as TEFLON.

To prevent an uneven distribution or mix of tint (e.g., colorant separation) in tint cartridges 160, an agitator or circulation system (not shown) may be used. In one example, cartridges 160 may be docked to an agitator that shakes or otherwise agitates each of cartridges 160 in one or more directions. In another example, cartridges 160 may include a closed loop circulation system that circulates the tint out of and back into cartridges 160. Using a closed loop circulation may also aid in preventing clogs. In yet another example, cartridges 160 may include internal paddles configured to move within cartridges 160 thereby agitating the tint stored therein.

Figure 5:
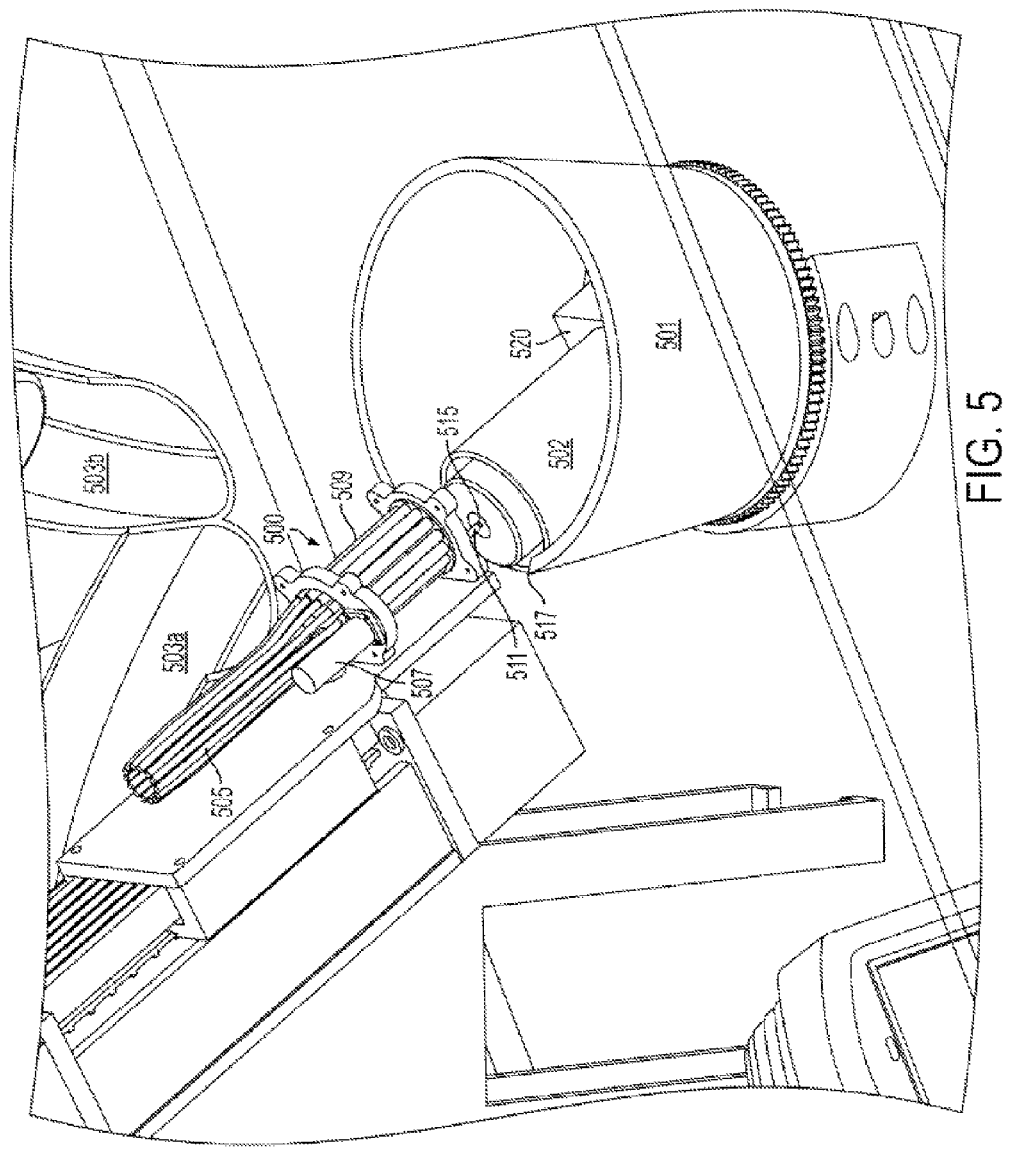
FIG. 5 illustrates an enlarged view of a nozzle assembly according to one or more aspects described herein.

FIG. 5 illustrates an enlarged view of an injector assembly and mixer portions of a paint sample system. The enlarged view includes injector assembly 500, mixer 501, sample bottle 502 and conveyors 503. The injector assembly 500 includes feed tubes 505 that draw tint from a tint reservoir (not shown), indexing motor 507, nozzle assembly 509 and nozzle 511. In use, indexing motor 507 is configured to rotate nozzle assembly 509 to select a nozzle for injecting a desired tint into a paint sample bottle. Stated differently, indexing motor 507 rotates nozzle assembly 509 such that a nozzle associated with a particular tint is rotated into alignment with an insertion hole of a paint sample bottle, e.g., insertion opening 515 of bottle 502. Indexing motor 507 may further actuate the extension of nozzles such as nozzle 511 from nozzle assembly 509. Alternatively or additionally, the extension of the nozzles from nozzle assembly 509 may be performed or assisted by another mechanism (not shown). In one or more configurations, bottle 502 may be tilted to angle opening 515 toward nozzle assembly 507. Accordingly, mixer 501, as illustrated, may include one or more grooves, e.g., groove 517, in the lip of the mixer to receive and secure bottle 502 in a tilted position.

As discussed, mixer 501 may further include a receptacle 520 that may be tilted at an angle (e.g., 30 degrees) relative to a horizontal plane so that when rotated, the paint is mixed in both a horizontal and vertical direction. Receptacle 520 is further configured to rotate to receive a paint container or bottle in a specified position, to align a paint container with tint injector assembly 500 or to eject the paint container into a dispensing chute (e.g., chute 125).

Referring again to FIG. 1, purchase interface 130 includes a computing system that is configured to allow a user to select and purchase a paint sample. In one arrangement, purchase interface 130 may include a touch screen device for user interaction and a network device for communicating with remote computing systems. For example, the network device may be used to authorize and complete credit card transactions. Purchase interface 130 may further include various payment systems including a bill acceptor, a coin slot, magnetic strip reading device and the like. Additionally or alternatively, purchase interface 130 may include a change dispensing system configured to dispense appropriate change for payments made with cash. In another alternative, purchase interface 130 may provide a receipt or print a code (e.g., bar code) on the paint sample, which the user can then use to pay for the sample at a cashier of the location in which the machine is located.

Color reader 135 may be used to scan or read an object to determine a color. Color reader 135 may be configured to read and determine colors using a variety of optical sensors known in the art. Color reader 135 may be further equipped with an object holder 140 having scanning surface 150 and adjustable arm 145. Adjustable arm 145 may be adjusted to hold and secure an object between arm 145 and scanning surface 150. A shelf 155 may also be provided under color reader 135 to allow a customer to place objects while making a paint sample purchase. Shelf 155 may also be adjustable in height or length or both to accommodate items of different sizes (e.g., a pillow).

According to one or more aspects, color reader 135 or a portion thereof (e.g., color reader 135 without adjustable arm 145) may be detachable from paint sampling system 100 and portable so that a customer may bring color reader 135 to the object that he or she wishes to scan. For example, color reader 135 may be portable color reader such as COLOR-HELPER by COLOR SAVVY. A detachable color reader may then be attached to a docking station (not shown) in paint sampling system 100 to obtain an appropriate paint sample. Alternatively, paint sampling system 100 may include both a stationary (i.e., non-portable) color reader in addition to one or more portable color readers. Customers may thus use the stationary color reader even when the portable color readers have been rented or are otherwise in use.

While system 100 of FIG. 1 has been described as being configured for creating and dispensing paint samples, such a paint creation and dispensing system may also be configured to create and dispense paint of larger (or smaller) amounts and sizes. For example, a paint creation and dispensing system may be configured to create a quart or gallon of paint (i.e., rather than a sample). In one embodiment, a paint creation and dispensing system may be configured to create and dispense paint of a variety of sizes. Thus, a base paint storage area may include storage sections that store different sized containers of base paint. Different sized tint injector nozzles may also be used so that tint may be dispensed in greater amounts and/or more quickly for larger containers of paint. Similarly, smaller tint nozzles may be used for smaller containers such as sample-sized containers of paint.

Figure 2:
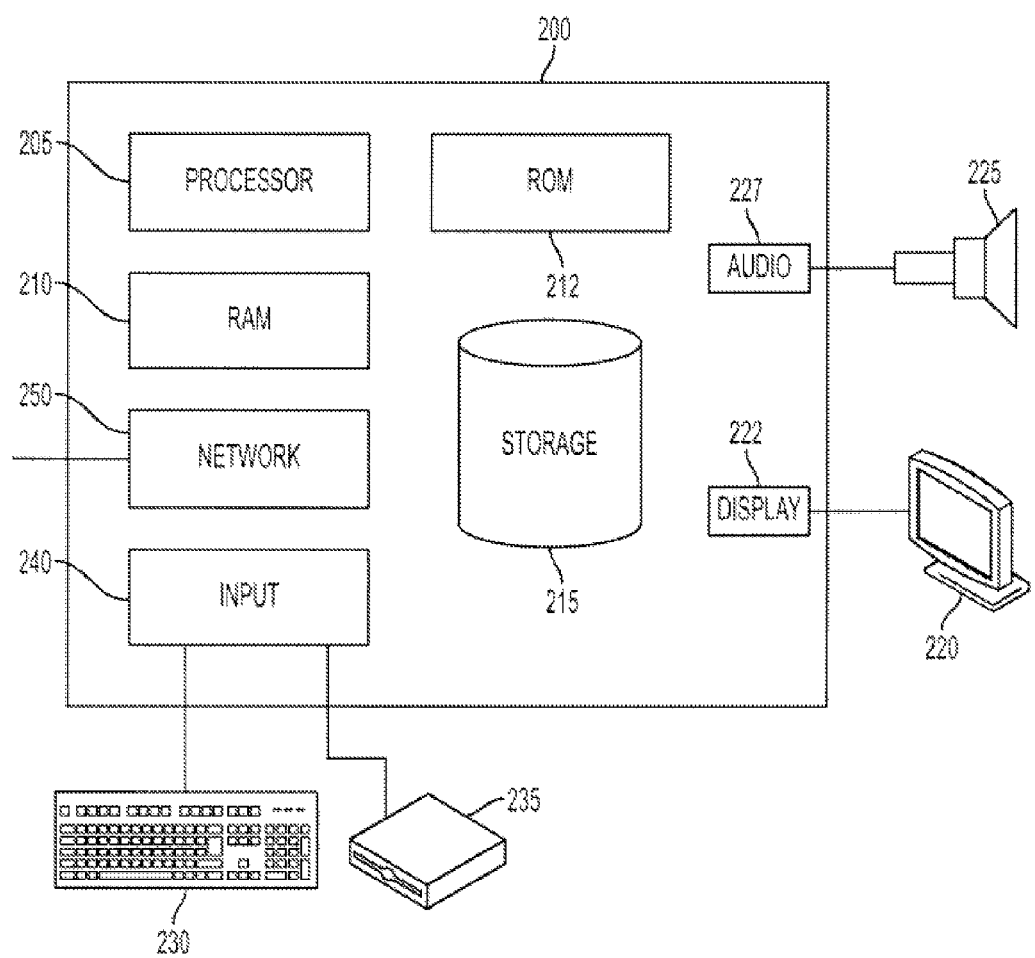
FIG. 2 illustrates a computing environment according to one or more aspects described herein.

As discussed, paint sampling system 100 may include one or more computing systems. Such computing systems may include a variety of components such as those illustrated in FIG. 2. Particularly, a computing device such as computer 200 may house a variety of components for inputting, outputting, storing and processing data. For example, processor 205 may perform a variety of tasks including executing one or more applications, retrieving data from a storage device such as storage 215 and/or outputting data to a device such as display 220. Processor 205 may be connected to Random Access Memory (RAM) module 210 in which application data and/or instructions may be temporarily stored. RAM module 210 may be stored and accessed in any order, providing equal accessibility to the storage locations in RAM module 210. Computer 200 may further include Read Only Memory (ROM) 212 which allows data stored thereon to persist or survive after computer 100 has been turned off. ROM 212 may be used for a variety of purposes including for storage of computer 200's Basic Input/Output System (BIOS). ROM 212 may further store date and time information so that the information persists even through shut downs and reboots. In addition, storage 215 may provide long term storage for a variety of data including applications and data files for controlling device 100 as described herein. Storage 215 may include any of a variety of computer readable media such as disc drives, optical storage media, magnetic tape storage systems, flash memory and the like. In one example, processor 205 may retrieve an application from storage 215 and temporarily store the instructions associated with the application RAM module 210 while the application is executing.

Computer 200 may output data through a variety of components and devices. As mentioned above, one such output device may be display 220. Another output device may include an audio output device such as speaker 225. Each output device 220 and 225 may be associated with an output adapter such as display adapter 222 and audio adapter 227, which translates processor instructions into corresponding audio and video signals. In addition to output systems, computer 200 may receive and/or accept input from a variety of input devices such as keyboard 230, storage media drive 235 and/or microphone (not shown). As with output devices 220 and 225, each of the input devices 230 and 235 may be associated with an adapter 240 for converting the input into computer readable/recognizable data. In one example, voice input received through microphone (not shown) may be converted into a digital format and stored in a data file. In one or more instances, a device such as media drive 235 may act as both an input and output device allowing users to both write and read data to and from the storage media (e.g., DVD-R, CD-RW, etc.).

Computer 200 may further include one or more communication components for receiving and transmitting data over a network. Various types of networks include cellular networks, digital broadcast networks, Internet Protocol (IP) networks and the like. Computer 200 may include adapters suited to communicate through one or more of these networks. In particular, computer 200 may include network adapter 250 for communication with one or more other computer or computing devices over an IP network. In one example, adapter 250 may facilitate transmission of data such as electronic mail messages, transaction data and other information over a company or organization's network. In another example, adapter 250 may facilitate transmission or receipt of information from a world wide network such as the Internet. In one or more arrangements, network adapter 250 may provide wireless network access for computer 200. Computer 200 may include a variety of other components and is not limited to the devices and systems described in FIG. 2.

Figure 6:
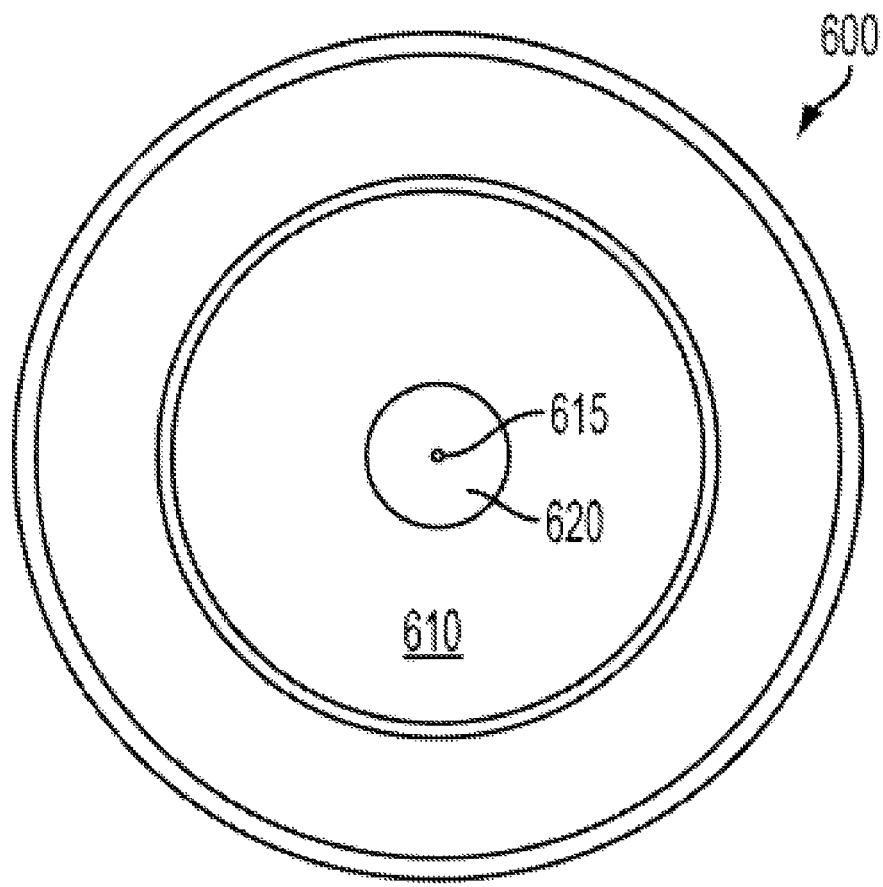
FIG. 6 illustrates a paint sample container according to one or more aspects described herein.

FIG. 6 is a top view of a paint sample container that may be used in conjunction with a paint sampling system such as system 100 of FIG. 1. Paint sample container 600 may include a cylindrical body for storing the paint and a cap portion 610 configured to prevent spillage. Cap portion 610 may be attached to container 600 in a variety of ways including screw-on and snap-on configurations. According to one aspect, cap portion 610 may include an injection opening 615 through which a nozzle may extend and tint may be injected. Injection opening 615 may include a seal, e.g, seal 620, of sufficient flexibility to allow a nozzle to penetrate therethrough while forming and maintaining an air or liquid-tight seal when the nozzle is withdrawn. Additionally, in order to clean and prevent tint buildup in a nozzle, the injection opening 615 may be lined with one or more absorbing materials that reduces or eliminates (e.g., by absorbing) residual tint on a nozzle upon extracting the nozzle from container 600. In one or more configurations, cap portion 610 may include a centrally located septum configured to allow the injection of tint into container 600. While container 600 is illustrated as a cylinder in FIG. 6, container 600 may be formed in a variety of shapes. Containers and container caps for paint of non-sample sizes may also be configured in the same or a similar fashion as the paint sample container 600 and cap 610 of FIG. 6.

Figure 7:
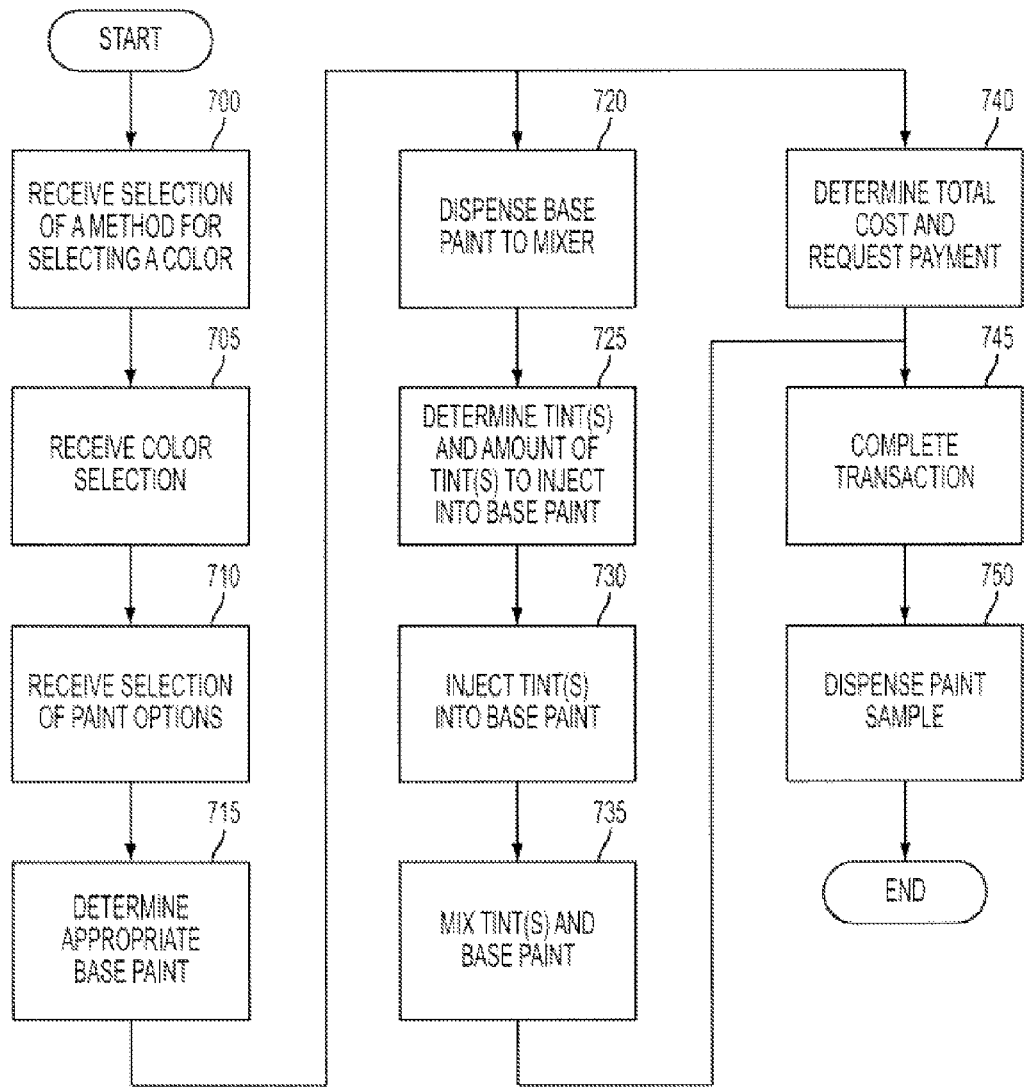
FIG. 7 is a flowchart illustrating a method for creating and processing payment for a paint sample according to one or more aspects described herein.

FIG. 7 is a flowchart illustrating a method by which a customer may select and purchase a sample of paint. In step 700, a sampling system may receive a selection of a method for selecting a color. For example, a customer may be provided with the choice of selecting a color based on a color code, a paint manufacturer, a color match using an electronic color reader/scanner, or color suggestions. In one arrangement, the paint sampling system may make color suggestions by asking the customer a series of questions regarding the use of the paint. Thus, based on information such as a room in which the paint will be used, colors of adjoining rooms or walls, furniture colors, interior or exterior use, and the like, suggestions may be provided. In step 705, the paint sampling system may receive a color selection using the selected method. Optionally, the paint sampling system may also receive other option selections such as paint brand and interior or exterior use in step 710. Paint and brand selection may be selected in a variety of ways including entry of a color code (e.g., a 6 digit paint ID number), selection of a color from a color palette, selection from a listing of brands and/or combinations thereof. Upon receiving the selection of the color (and, in some instances, paint options), the paint sampling system may determine an appropriate base paint with which to create the sample in step 715. For example, an appropriate base paint may be identified based on interior or exterior use and a desired finish. Thus, if a customer would like a flat finish, a flat base paint may be used. Next, in step 720, the paint sampling system may dispense the determined base paint from a base paint storage area into a mixer where tints may be injected into the base paint to form the selected color.

The tints and amount of tint to be used may be determined in step 725 according to predefined color formulas. The predefined color formulas may be stored in memory of the paint sampling system. In one example, to create an emerald color, a certain amount of blue tint, yellow tint, and other appropriate tint(s) may be added to the base paint in accordance with the color formula for emerald. Once the tints and amount of tint have been determined, the paint sampling system may inject the base paint with the appropriate amounts of tint in step 730. After injecting the tint(s), the paint sampling system may then mix the tint(s) and the base paint to ensure that the color is consistent throughout the sample in step 735.

Simultaneously or substantially simultaneously with the preparation of the paint sample (e.g., including determination of tints and tint amounts and mixing the paint sample), the paint sampling system may process payment for the requested sample. In particular, the paint sampling system may determine a total cost and request payment in step 740. Upon receiving payment and completing the transaction in step 745, the prepared paint sample may subsequently be dispensed to the customer in step 750. In one or more configurations, the paint sampling system may further generate a paint label that identifies the paint contained therein. Such identification information may include the color of the paint, the brand, the type of base paint and the like. When identifying the color, the paint sampling system may provide a sample (e.g., a dot or drop) of the paint on the label or some other location of the paint sample container.

A customer may further create an account and/or save color and transaction information when obtaining a paint sample so that the customer may later retrieve the colors without having to search for them again. Color information may include identification of the colors for which samples were created and purchased while transaction information may include other paint characteristics such as finishes, brands, interior/exterior use and the like. By saving color and transaction information, the customer may return to purchase larger sized containers of a selected color once he or she has decided on appropriate colors, as discussed in further detail below.

Figure 8:
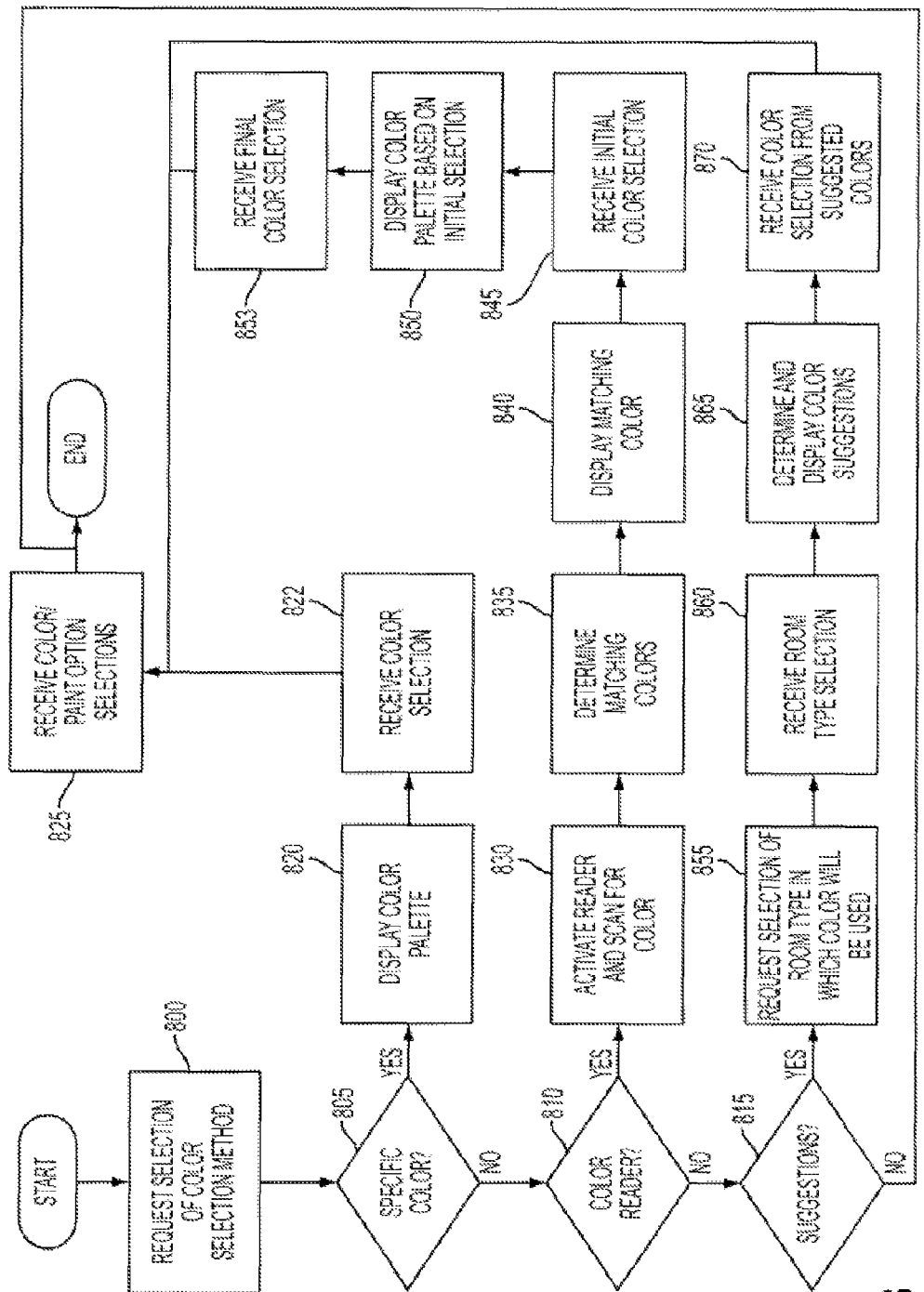
FIG. 8 is a flowchart illustrating a method for selecting and using a color selection method according to one or more aspects described herein.
Figure 9:
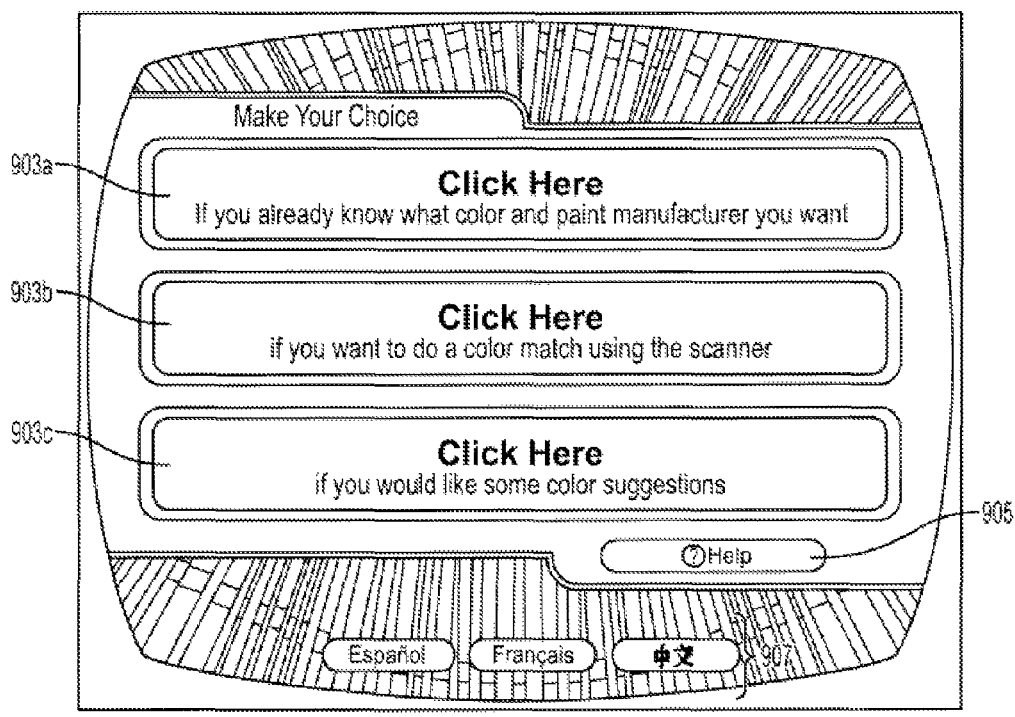
FIGS. 9-12 illustrate interfaces for making selections of a color selection method, a color and color options according to one or more aspects described herein.

FIG. 8 is a flowchart illustrating a method for selecting a color according to aspects described herein. As noted in FIG. 7, colors may be selected using a variety of methods. Thus, in step 800, a customer may be asked to select whether he or she would like to choose a color by entering a specific color code, by browsing a color palette and selecting a specific color, by performing a color match using a color reader/scanner or by reviewing color suggestions. FIG. 9 illustrates one embodiment of a user interface for making such a selection. Interface 900 may include the three aforementioned options 903*a-c* as well as help option 905 and language options 907.

Figure 10:
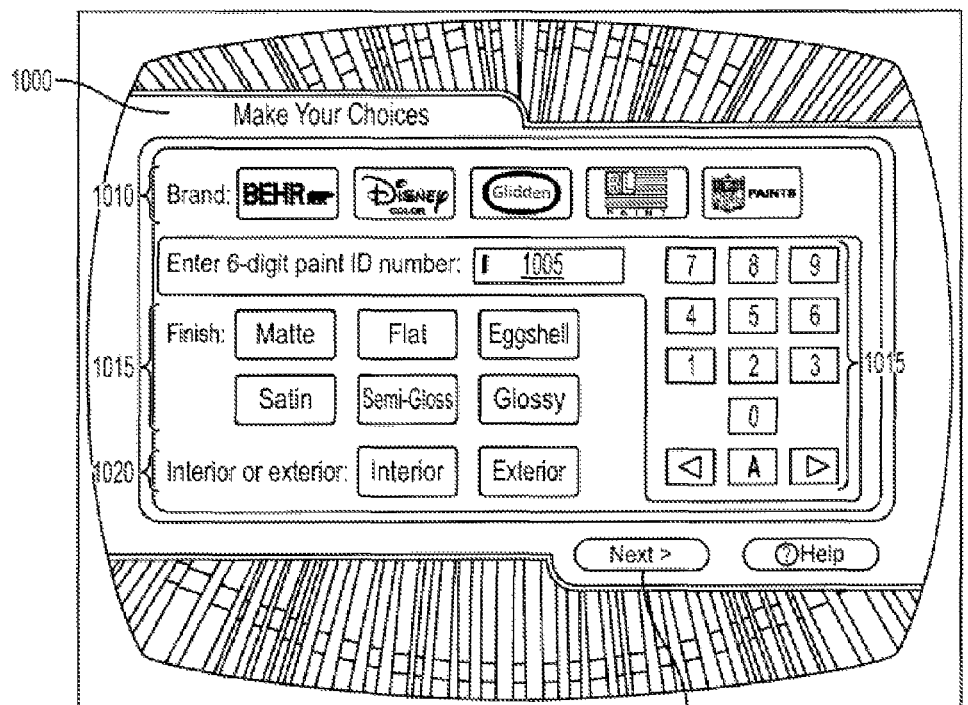

Once a selection of a color selection method has been received, the system may determine which method has been selected in steps 805-815. If the customer selected selection by palette, a color palette may be displayed in step 820. The color palette may expand to show similar or additional colors as the customer interacts with the system (e.g., by choosing a particular color from a current palette). Once a color selection has been received, e.g., in step 822, the sample system may request selection of one or more options including a final color ID, a paint brand, a finish and a use of the paint (e.g., interior or exterior) in step 825. FIG. 10 illustrates a user interface through which color option selections may be made. Interface 1000 includes ID input area 1005, brand selection area 1010, finish selection area 1015 and use selection area 1020. Interface 1000 may further include a keypad 1025 for entering a paint ID. A next option 1030 for proceeding to the next step may be grayed out (i.e., indicating it is inactive) until all required information has been selected. In one or more configurations, the color ID may be automatically populated based on a color selection made in a previous screen.

Referring again to FIG. 8, if, on the other hand, a customer chooses to select a color based on a color match, the paint sampling system may activate a color reader and scan an object placed therein in step 830. In some instances, if the customer is using a portable color reader, the paint sampling system may download scanned color information from the portable color reader. Specifically, in one instance, the paint sampling system may receive notification that a portable color reader has been docked to the system and subsequently request color data from the reader. In step 835, the paint sampling system may determine one or more colors that match the color of the scanned object. Various methods of color matching may be used including comparing levels of red, blue and green in a pair of colors. In step 840, the paint sampling system may display the matching or the closest matching colors. Upon receiving a selection of one of the colors in step 845, the paint sampling system may display the color choice as well as additional color options in a color palette in step 850. The additional color options may be similar to the selected color and may include accents. The paint sample system may then receive a selection of a final color from the color palette in step 853. Upon receiving the selection, the system may request selection of color options as discussed in step 825.

Figure 11:
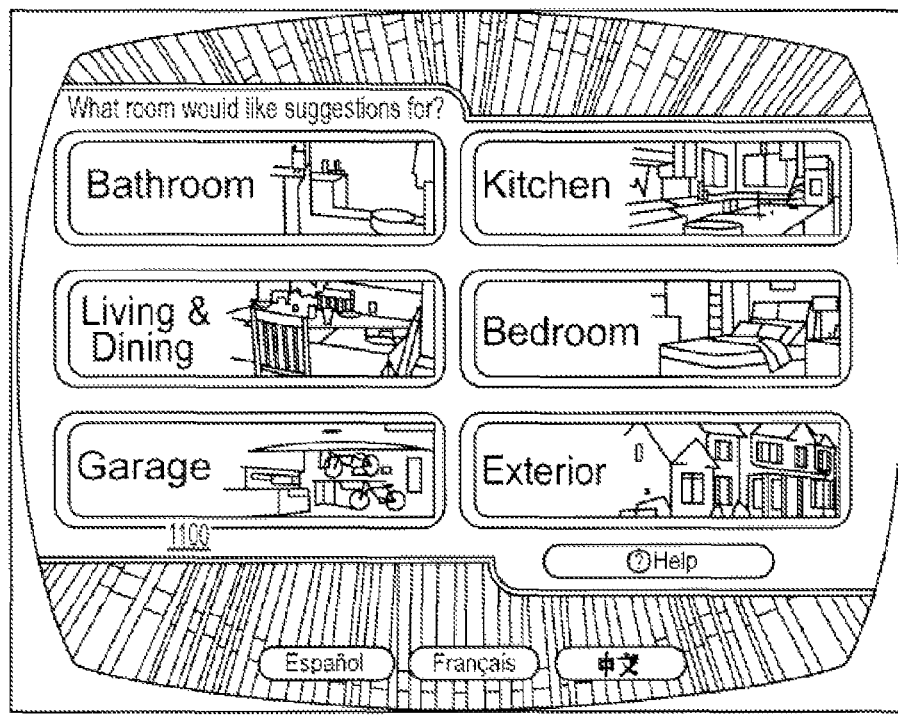

Finally, if the color selection based on color suggestion method is chosen, the paint sampling system may initially request a selection of a room in which the paint will be used in step 855. In one example, the paint sampling system may display an interface 1100 listing multiple types of room, as illustrated in FIG. 11. For example, room types may include bathrooms, living & dining areas, kitchen spaces, bedrooms, garages and exteriors. Upon receiving a selection of one of the room types in step 860, the paint sample system may determine and display color suggestions for the selected room type in step 865. Color suggestions may be made based on popular colors for the room type, suggestions by design experts, style trends and the like. In one or more instances, a video that provides examples of how colors are used in the selected room type may be played in conjunction with (e.g., before) the display of the color suggestions. Upon receiving a selection of a color from the color suggestions in step 870, the paint sample system may proceed to request color option selections in step 825.

Figure 12:
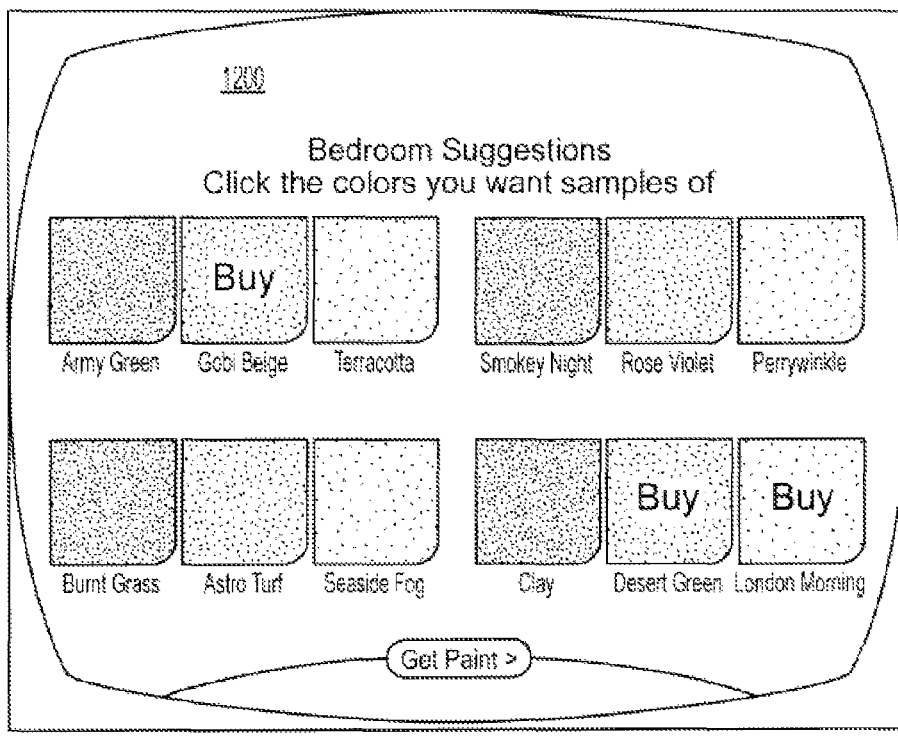

FIG. 12 illustrates an interface showing a variety of color suggestions for a selected room type. The color suggestions may be grouped to identify which colors might look best together. Interface 1200 may allow a user to select multiple colors from the color suggestions to obtain a sample of each color.

Once a color or colors have been selected, the paint sample system may proceed to prepare the sample and process payment as described in FIG. 7. Additionally or alternatively, each of the above color selection methods may allow a user to select multiple colors at a time to obtain multiple samples through one transaction. Thus, in such instances, the customer may be requested to select color options (e.g., in step 825) for each of the multiple selected colors.

According to one or more aspects, a paint sampling system may have network capabilities and be connected to a network like the Internet or a store's intranet. Thus, the paint sampling system may allow a customer to pre-order or pre-select colors and options prior to arriving at the paint sampling system so that once the customer arrives at the system, he or she might only need to complete payment to receive their paint sample (i.e., without having to go through the color and paint selection processes). Further, a customer may upload color information from a portable color reader to a home or work computer and upload that information to the paint sampling system. Still further, once a customer has decided on a color using samples, the customer may request and purchase a full size (e.g., a quart or gallon) of the desired color as well as paint supplies needed for painting one or more areas.

Figure 13:
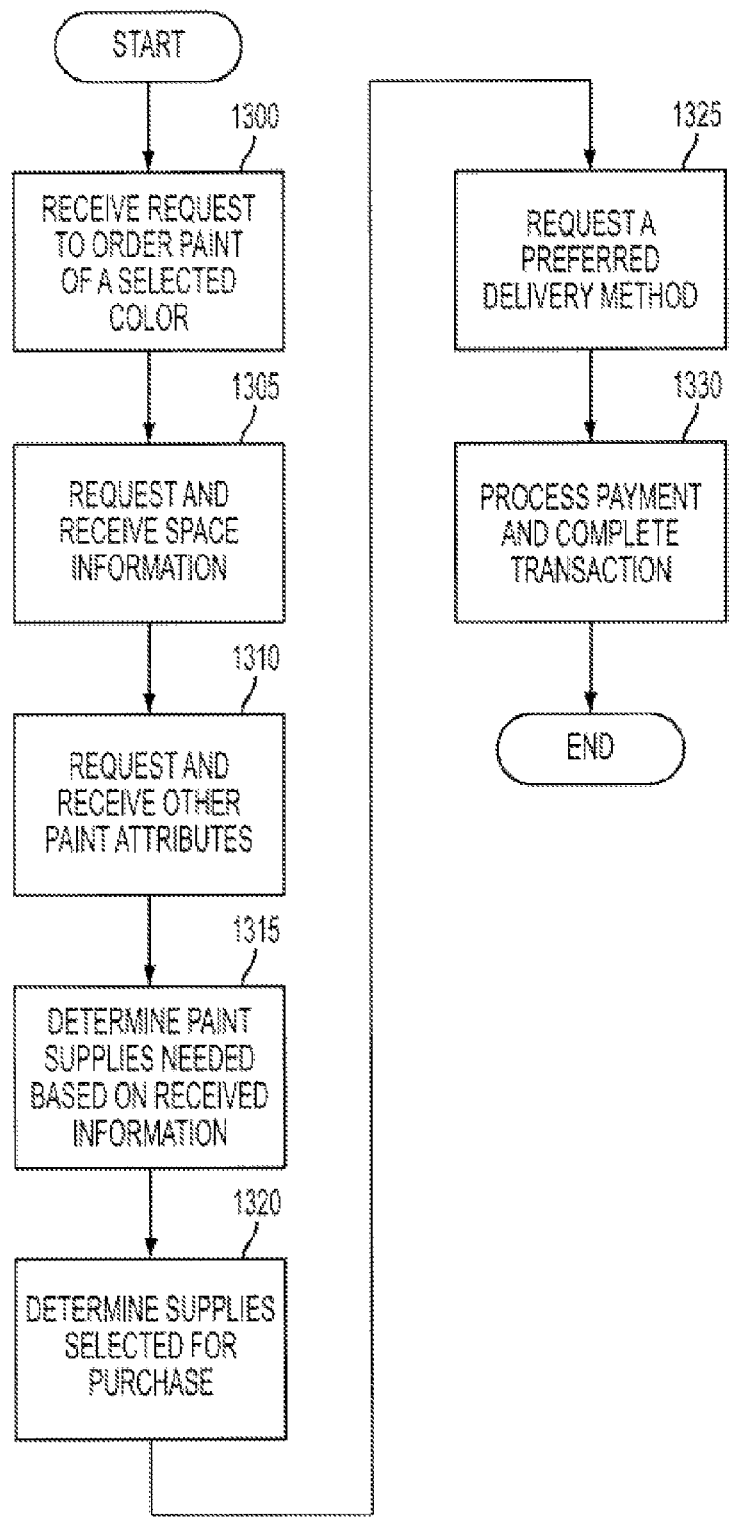
FIG. 13 is a flowchart illustrating a method for processing an order for paint supplies according to one or more aspects described herein.

FIG. 13 is a flowchart illustrating a method for processing orders for paint and paint supplies once a customer has decided on a color. In step 1300, an ordering system may receive a request to order paint of a selected color. The order request may be made locally in a store or remotely from home through a network. The order may include a color code for identifying the desired color and/or a transaction code that provides information regarding other paint characteristics such as a type of finish (e.g., matte, gloss, semi-gloss), a type of use (e.g., interior or exterior), a desired brand and the like. The color and transaction information may be saved, for example, when a customer initially purchases color samples. Thus, when a customer decides on a color, he or she may find the selected color from the saved color and transaction information. In one arrangement, a customer may create an account and may then access color and transaction information through an order history.

In step 1305, the ordering system may request and receive information relating to the room, area or surface on which the paint is to be used. The information may include a room or area size, whether there is furniture in the room, a number of windows or size of windows and the like. In step 1310, the ordering system may further request and receive paint attributes other than color such as selections of a special finish (e.g., glazing, sponging, ragging). In step 1315, the ordering system may determine supplies needed for the selected special finish and for the specified room or area. Supplies may include the amount of paint needed to paint the space, brushes, rollers, trays, sponges, paint tape, furniture covers and the like. In one example, if a customer wishes to paint a wall that is 10 feet by 15 feet, the ordering system may determine how many quarts or gallons of paint would be needed to cover the 150 square feet.

In step 1320, the ordering system may determine which supplies the customer wishes to purchase. For example, the ordering system may allow a customer to select a subset of the determined supplies for purchase. Once the desired supplies have been identified, the ordering system may request a preferred delivery method for the supplies in step 1325. That is, the ordering system may ask the customer whether he or she wishes to have the supplies delivered or if they would like to pick-up the order in a store. Upon receiving a delivery method, the ordering system may process payment for the ordered supplies and complete the transaction in step 1330.

Alternatively or additionally, a customer might not need to purchase the supplies through the ordering system. Instead, the customer may print out a list of the recommended supplies and bring the list to a store and manually select and purchase desired items from the list. Various combinations of delivery, pick-up and manual purchasing may also be supported by the ordering system and used by the customer.

While the aspects described herein relate generally to a paint sample creation and dispensing system, similar features may be used for mixing and dispensing other types of products. For example, an ice cream machine may use a similar system to dispense a desired ice cream cone from a cone storage area and use a nozzle assembly to dispense different flavors or combination of flavors of ice cream. Other examples may include making mixed drinks (e.g., in bars), creating and dispensing make-up (e.g., foundation for matching skin tones), creating hair dyes, dispensing mixtures of coffees, stains (e.g., for decking and wood surfaces) and mixing grout or caulk.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method comprising:
  receiving, by a paint dispensing device, a selection of a paint color;

determining, by the paint dispensing device, a type of base paint based on at least the selected paint color;

identifying, by the paint dispensing device, a paint container storing the determined type of base paint;

automatically dispensing, by the paint dispensing device, the identified paint container from a storage area of the paint dispensing device to a mixer of the paint dispensing device, automatically dispensing the identified paint container to the mixer including dispensing the paint container to the mixer in a manner such that one or more grooves in a lip of the mixer support a portion of the paint container in a tilted position relative to a vertical axis of the mixer;

determining, by the paint dispensing device, at least one tint to inject into the paint container to create paint of the selected paint color;

aligning, by the paint dispensing device, a nozzle corresponding to the determined at least one tint with the paint container; and injecting, by the paint dispensing device, the determined at least one tint into the paint container.

2. The method of claim 1, further comprising:
processing payment for the paint of the selected paint color by the paint dispensing device.

3. The method of claim 1, further comprising:
automatically reading, at the paint dispensing device, a color of an object, wherein the selection of the paint color is based on the automatic reading, the paint color corresponding to the color of the object.

4. The method of claim 1, wherein receiving the selection of the paint color includes receiving the selection over a network connection.

5. The method of claim 1, wherein receiving the selection of the paint color includes receiving color data from an electronic color reader.

6. The method of claim 5, further comprising:
detecting that the electronic color reader is connected to the paint dispensing device; and requesting the color data from the electronic color reader in response to detecting that the electronic color reader is connected to the paint dispensing device.

7. The method of claim 2, wherein processing payment for the created paint of the selected color is performed overlapping performance of at least one of: injecting the determined at least one tint into the paint container and determining at least one tint to inject into the paint container to create the paint of the selected paint color.

8. A paint dispensing apparatus comprising:
a paint container storage area;
a mixer, the mixer including one or more grooves in a lip of the mixer;
at least one processor; and
memory storing computer readable instructions that, when executed by the at least one processor, cause the paint dispensing apparatus to:
receive a selection of a paint color;
determine a type of base paint based on at least the selected paint color;
identify a paint container storing the determined type of base paint;
automatically dispense the identified paint container from the paint container storage area to the mixer, wherein the paint dispensing apparatus is configured to dispense the paint container to the mixer in a manner such that the one or more grooves support a portion of the paint container in a tilted position relative to a vertical axis of the mixer;
determine at least one tint to inject into the paint container to create paint of the selected paint color;
align a nozzle corresponding to the determined at least one tint with the paint container; and
inject the determined at least one tint into the paint container.

9. The paint dispensing apparatus of claim 8, wherein the computer readable instructions, when executed, further cause the paint dispensing apparatus to process payment for the paint of the selected paint color.

10. The paint dispensing apparatus of claim 8, wherein the computer readable instructions, when executed, further cause the paint dispensing apparatus to automatically read a color of an object, wherein the selection of the paint color is based on the automatic reading, the paint color corresponding to the color of the object.

11. The paint dispensing apparatus of claim 8, wherein the apparatus further includes a conveyor slide configured to convey the dispensed paint container from the paint container storage area to the mixer.

12. The paint dispensing apparatus of claim 8, wherein the paint container storage area is configured to store a plurality of paint containers including at least a first container storing a first type of base paint and at least a second container storing a second type of base paint.

13. One or more non-transitory computer readable media storing computer readable instructions that, when executed by a processor, cause a paint dispensing apparatus to:
receive a selection of a paint color;
determine a type of base paint based on at least the selected paint color;
identify a paint container storing the determined type of base paint;
automatically dispense the identified paint container from a storage area of the paint dispensing apparatus to a mixer, wherein automatically dispensing the identified paint container to the mixer includes dispensing the identified paint container to the mixer in a manner such that the paint container is supported by one or more grooves in a lip of the mixer in a tilted position relative to a vertical axis of the mixer;
determine at least one tint to inject into the paint container to create paint of the selected paint color;
align a nozzle corresponding to the determined at least one tint with the paint container; and
inject the determined at least one tint into the paint container.

14. The one or more computer readable media of claim 13, wherein aligning the nozzle includes rotating a nozzle assembly comprising a plurality of nozzles.

15. The one or more computer readable media of claim 13, wherein receiving the selection of the paint color includes receiving the selection over a network connection.

* * * * *